United States Patent
Bowers

[11] 3,808,906
[45] May 7, 1974

[54] GEARING WITH VIBRATION DAMPING MEANS

[75] Inventor: George L. Bowers, Mooresville, Ind.

[73] Assignee: General Motors Corporation, Detroit, Mich.

[22] Filed: Apr. 21, 1972

[21] Appl. No.: 246,163

[52] U.S. Cl. .................................. 74/443, 74/461
[51] Int. Cl. ............................................ F16h 55/14
[58] Field of Search ............................ 74/443, 461

[56] References Cited
FOREIGN PATENTS OR APPLICATIONS
1,011,626   12/1965   Great Britain ...................... 74/443
834,799    3/1952    Germany ............................ 74/443

Primary Examiner—Samuel Scott
Assistant Examiner—Frank H. McKenzie, Jr.
Attorney, Agent, or Firm—Charles R. White

[57] ABSTRACT

Meshing gears are provided with elastomeric inserts secured in the roots of the gear teeth. The inserts are serially contacted and deflected by the tips of the gear teeth as the gears rotate to damp gear vibrations resulting from gearing impulses that occur at a base frequency proportional to the number of gear teeth and the gear speed.

2 Claims, 4 Drawing Figures

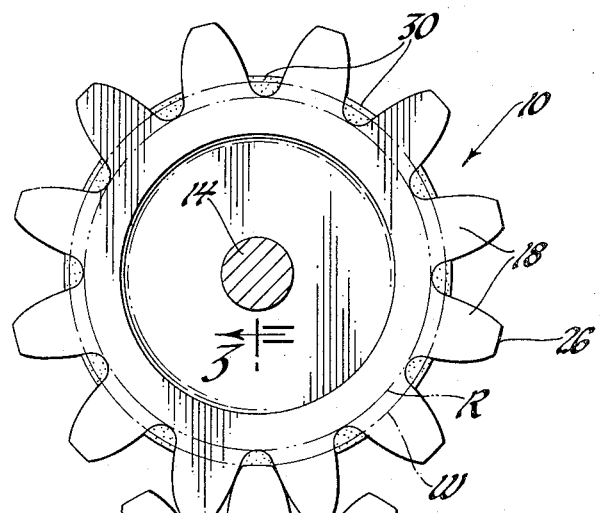
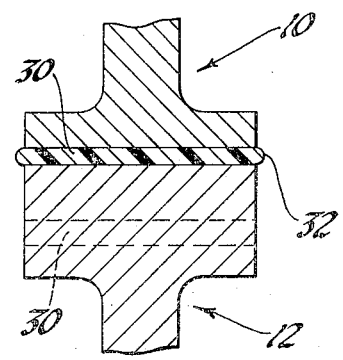
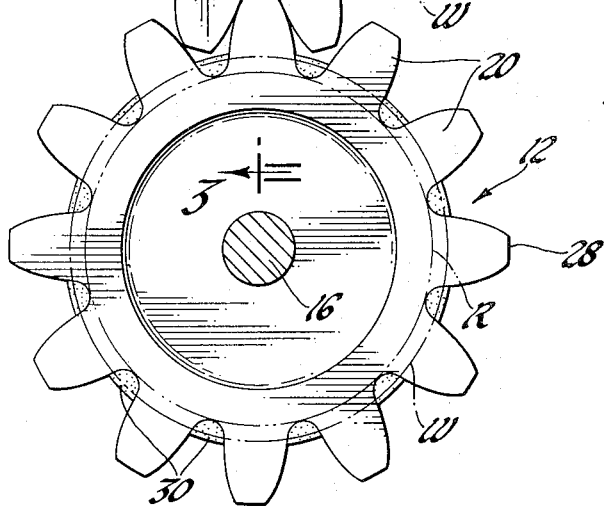
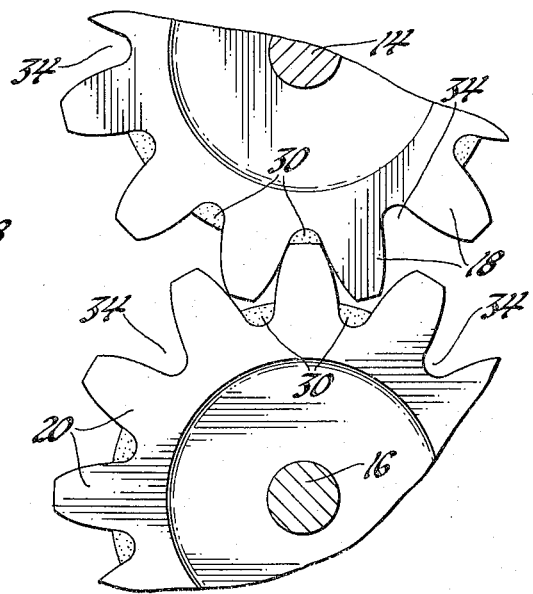
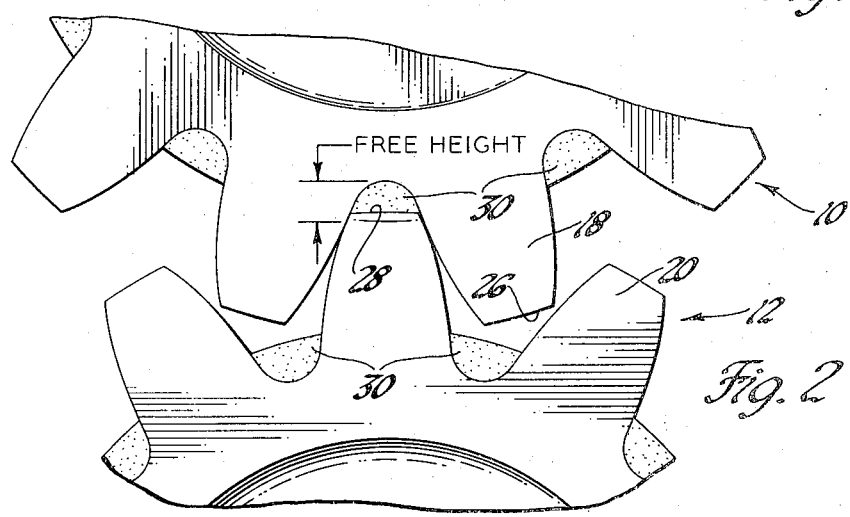

GEARING WITH VIBRATION DAMPING MEANS

This invention relates to gearing and more particularly to meshing gears with elastomeric inserts disposed in the roots of the gear teeth which are deflected as the gears rotate to damp gear vibrations.

Many different damping devices have been employed in toothed gearing to reduce gear vibration from gearing impulses created by tooth engagement forces at the area of initial contact of each pair of gear teeth. Without effective vibration damping, the gear impulses produce objectionable noise of which the predominant frequency is the tooth frequency which is the product of the rotational frequency of the gear and the number of peripheral teeth.

While many prior gear vibration damping devices were employed with good results generally, their service life, costs and size did not justify their use. This is particularly the case when the vibration damping device involving elastomeric dampers which are generally subjected to large torque loads often in excess of the elastic limit of the device.

This invention provides new and improved vibration damping means comprising elastomeric vibration damping inserts selectively disposed and retained in roots of the gear teeth. In the preferred form of the invention the inserts extend slightly above the working depth circle of the supporting gear so that they are contacted and are slightly deformed by the top lands or tips of the gear teeth as they roll into mesh. This yielding resilient support at the tips of the gear teeth provides an effective device to reduce gear and tooth vibrations particularly those generated by gear impluses resulting from tooth engagement forces at the area of initial contact of each pair of gear teeth.

A feature, object and advantage of this invention is to provide a new and improved energy absorbing means for damping gear mesh generated vibrations.

Another feature, object and advantage of this invention is to provide new and improved elastomeric inserts for meshing gears that are retained in the roots of the teeth of gears which inserts have a free height that extends above the working depth circle of the supporting gear so that the teeth of the meshing gear directly contact and deform the insert which deflects under load to absorb vibratory energy thereby effectively reducing gear noise and wear.

Another object, advantage and feature of this invention is to provide a new and improved vibration damper in which elastomeric members are operatively disposed in the roots of the teeth of meshing gears which are adapted to be contacted and deformed by the tips of the gear teeth as they roll into mesh to automatically smother gear tooth vibration whenever it occurs.

Another feature and object of this invention is to operatively dispose vibration damping units in the roots of the teeth provided by the tooth spacing of meshing gear members in an irregular pattern to provide for vibration damping and for breaking up harmonic vibrations and thereby reduce gear noise.

Another feature, object and advantage of this invention is to make full use of the construction of gear teeth by employing the top lands of at least one of the meshing gears to contact an elastomeric dampener as the gears rotate for vibration damping purposes.

These and other features, objects and advantages of this invention will be more apparent from the following detailed description and drawing in which:

FIG. 1 is a side view of a pair of meshing gears illustrating the invention;

FIG. 2 is an enlarged view of a portion of the gears of FIG. 1;

FIG. 3 is a sectional view taken along lines 3—3 of FIG. 1;

FIG. 4 is a side view of a pair of meshing gears illustrating another embodiment of the invention.

FIG. 1 shows meshing metallic spur gears 10 and 12 having a central hub or web portion rotatably mounted in a support by shafts 14 and 16. Each of the gears 10 and 12 respectively have a plurality of equally spaced and radially projecting gear teeth 18 and 20. Between any two adjacent teeth is the space known as the tooth space for receiving a tooth of the meshing gear as the gears rotate about their axes. Each tooth extends upwardly from the root circle R and terminates in a top land 26 or 28. Each gear has a working depth circle W of a larger radius than the root circle R. The radial difference between these two circles is the built-in clearance between the top land of one gear and the root circle of the meshing gear.

Bonded or otherwise secured in the tooth spaces of each of the gears are block-like inserts 30 of a suitable elastomer material such as neoprene. These inserts extend radially outwardly from the associated root circle, and have a free height which is above the working circle W. As shown in FIG. 3, the inserts preferably have a width which in the free state is equal to the width of the gear teeth. If desired the width can be less than that of the gear teeth so that insert deflection will not extend beyond the sides of the gear teeth. As one gear drives the other, the top lands of the teeth 18 and 20 will contact and deflect the elastomeric inserts after entry into the tooth space. Under full load the inserts will be deflected from the free height as shown in FIG. 2 and the displacement will cause the ends of the inserts to bulge beyond the sides of the gear as illustrated at 32 in FIG. 3. Any vibratory energy from the result of tooth engagement forces is damped by the internal hysteresis of the elastomeric inserts. This damping effective directly at the main source of vibration, i.e., the vibrating gear teeth, substantially reduces gear noise and wear. Thus with this construction vibration is damped as it occurs in the gearing without employing auxiliary vibration devices carried externally of the gearing. Backlash such as might occur when the driven gear suddenly becomes the driving gear is effectively reduced by the yielding resistance to the back drive provided by the inserts.

In the FIG. 4 embodiment, neoprene inserts 30 are secured in only selected tooth spaces so that some tooth spaces such as those identified by numeral 34 do not have any vibration damping feature. This provides an irregular pattern of vibration damping inserts which act to break up harmonics.

While particular embodiments of this invention have been shown and described it will be understood that other embodiments may be made without departing from the spirit and scope of this invention which is defined in the following claims.

I claim:

1. In a gear train having rotatable first and second meshing gear members, each of said gear members having a plurality of gear teeth projecting radially with respect to its axis of rotation, each of said gear teeth having a top land, said gear members having a tooth space with a bottom land between any two adjacent teeth, each of said gear members having gear tooth clearance space between said top lands of said gear teeth and the bottom lands of said tooth spaces, elastomeric insert means for each of said gear members, fastener means securing said insert means entirely within a predetermined number of said tooth spaces in each of said gears, said predetermined number of tooth spaces being less than the total number of said tooth spaces, each of said insert means having a free height greater than the height of said gear tooth clearance space to provide a direct and yielding peripheral support for each of said gear members and to provide resilient contact surfaces for the top lands of only some of said gear teeth for damping tooth vibrations while allowing the other of said gear teeth to vibrate to thereby reduce gear noise and harmonics as said gear members rotate.

2. In gearing, rotatable first and second meshing gears each having a plurality of radially disposed gear teeth, each of said gear teeth having a top land and each cooperating with an adjacent tooth to provide a tooth space with a bottom land therebetween, each of said gears having a root circle of a first radius and a working depth circle having a radius larger than said first radius to provide clearance between said top lands of said gear teeth of one of said gears and the bottom lands of the tooth spaces of the other of said gears, block-like elstomeric insert means yieldable under compression load to damp gear vibrations for each of said gears, fastening means securing said insert means in a plurality of said tooth spaces in each of said gears, said plurality of tooth spaces in each of said gears being less than the total number of tooth spaces therein, each of said insert means being entirely disposed in a tooth space and each having a free height which terminates in a top portion disposed radially outwardly of said working depth circle for only direct contact with and deflection by the top lands of predetermined teeth of the meshing gear as said gears rotate so that there is radial yielding support of only some of said gear teeth as said first and second gears rotate to dissipate vibratory energy of some of said gear teeth while allowing free vibration of other of said gear teeth to thereby damp the natural vibratory frequency of said gears.

* * * * *